US011120224B2

(12) United States Patent
Malik et al.

(10) Patent No.: US 11,120,224 B2
(45) Date of Patent: Sep. 14, 2021

(54) EFFICIENT TRANSLATING OF SOCIAL MEDIA POSTS

(71) Applicant: International Business Machines Corporation, Armonk, NY (US)

(72) Inventors: Pooja Malik, New Delhi (IN); Vikram Yadav, Farrukhabad (IN); Gopal Bhageria, Kolkata (IN); Sandeep Sukhija, Noida (IN)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 16/131,438

(22) Filed: Sep. 14, 2018

(65) Prior Publication Data
US 2020/0089763 A1 Mar. 19, 2020

(51) Int. Cl.
*G06F 40/00* (2020.01)
*G06F 40/30* (2020.01)
(Continued)

(52) U.S. Cl.
CPC .............. *G06F 40/30* (2020.01); *G06F 40/51* (2020.01); *G06N 20/00* (2019.01); *G06F 40/40* (2020.01);
(Continued)

(58) Field of Classification Search
None
See application file for complete search history.

(56) References Cited

U.S. PATENT DOCUMENTS 6,167,369 A * 12/2000 Schulze ................ G06F 40/284
704/9
7,266,491 B2 * 9/2007 Humphreys ............ G06F 40/56
704/4

(Continued)

FOREIGN PATENT DOCUMENTS

WO WO2016/085409 A1 2/2016
WO WO2016/035072 A2 10/2016

OTHER PUBLICATIONS

Azadnia, Mohammad et al., "Natural language processing Laboratory Plan: An essential for Persian language", INC2010: 6th International Conference on Networked Computing, May 11-13, 2010.
(Continued)

*Primary Examiner* — Richard Z Zhu
(74) *Attorney, Agent, or Firm* — Stephen J. Walder, Jr.; Alexander Jochym (57) ABSTRACT

Mechanisms are provided to implement an efficient translating mechanism to efficiently translating social media posts. A source language to be used to translate the social media post is identified based on words within the social media post. A highest classification is identified and the social media post is translated from the source language to a target language using a translation level associated with the highest classification. In the translation, each word and its related meaning in the target language are identified from a multi-language data structure; each word is categorized into its associated part of speech; a sentence is generated in the target language; and natural language processing is performed on each sentence in the target language to identity the existence of ambiguous connotations. Responsive to each sentence failing have any ambiguous connotations, a social medial post is generated in the target language utilizing the generated sentences.

17 Claims, 5 Drawing Sheets

(51) Int. Cl.
　　　*G06N 20/00*　　　(2019.01)
　　　*G06F 40/51*　　　(2020.01)
　　　*G06F 40/49*　　　(2020.01)
　　　*G06F 40/44*　　　(2020.01)
　　　*G06F 40/47*　　　(2020.01)
　　　*G06F 40/40*　　　(2020.01)
　　　*H04L 12/58*　　　(2006.01)

(52) U.S. Cl.
　　　CPC .............. *G06F 40/44* (2020.01); *G06F 40/47* (2020.01); *G06F 40/49* (2020.01); *H04L 51/32* (2013.01)

(56) References Cited

U.S. PATENT DOCUMENTS

| | | | | |
|---|---|---|---|---|
| 8,195,447 | B2* | 6/2012 | Anismovich | G06F 40/40 |
| | | | | 704/4 |
| 8,359,191 | B2 | 1/2013 | Chen | |
| 8,738,358 | B2* | 5/2014 | Zhu | G06F 40/58 |
| | | | | 704/4 |
| 2004/0210444 | A1* | 10/2004 | Arenburg | G10L 15/005 |
| | | | | 704/277 |
| 2005/0137854 | A1* | 6/2005 | Cancedda | G06F 16/3347 |
| | | | | 704/9 |
| 2006/0095248 | A1* | 5/2006 | Menezes | G06F 40/44 |
| | | | | 704/3 |
| 2006/0224378 | A1* | 10/2006 | Chino | G06F 40/30 |
| | | | | 704/2 |
| 2006/0293876 | A1* | 12/2006 | Kamatani | G06F 40/40 |
| | | | | 704/2 |
| 2007/0100601 | A1* | 5/2007 | Kimura | G06F 40/268 |
| | | | | 704/4 |
| 2008/0262827 | A1* | 10/2008 | DeGroot | G06F 40/45 |
| | | | | 704/3 |
| 2013/0297285 | A1* | 11/2013 | Kwon | G06F 40/58 |
| | | | | 704/2 |
| 2014/0297252 | A1* | 10/2014 | Prasad | G10L 15/01 |
| | | | | 704/2 |
| 2015/0106702 | A1* | 4/2015 | Scott | G06F 3/0237 |
| | | | | 715/265 |
| 2017/0083504 | A1* | 3/2017 | Huang | G06F 40/117 |
| 2019/0114317 | A1* | 4/2019 | Zhang | G06F 40/30 |

OTHER PUBLICATIONS

IBM, "AlchemyLanguage", https://www.ibm.com/watson/developercloud/alchemy-language.html, downloaded from the Internet on May 24, 2108, 5 pages.

IBM, , "Watson Language Translator", https://www.ibm.com/watson/services/language-translator/, downloaded from the internet on May 24, 2018, 10 pages.

Tao, Jianhua et al., "Advances in Chinese Natural Language Processing and Language Resources", 2009 Oriental COCOSDA International Conference on Speech Database and Assessments, Aug. 10-12, 2009, 6 pages.

Zhang, Huiqi et al., "Socioscope: Human Relationship and Behavior", IEEE Transactions on Systems, Man, and Cybernetics—Part A: Systems and Humans, vol. 41, No. 6, Nov. 2011, 22 pages.

* cited by examiner

EFFICIENT TRANSLATING OF SOCIAL MEDIA POSTS

BACKGROUND

The present application relates generally to an improved data processing apparatus and method and more specifically to mechanisms for efficiently translating social media posts using deep-learning techniques.

Language translation is a communication of a meaning of a source-language text by means of an equivalent target-language text. Language translation plays an important role in analyzing the context of any published matter. Since huge data (4V—volume, variety, velocity, and veracity) is being generated every second across the world, difficulty exists in keeping an eye on all activities/posts published in social media. Furthermore, any language translator has an inherent risk of inadvertently introducing source-language words, grammar, or syntax into the target-language rendering. However, such "spill-overs" have sometimes imported useful source-language calques and loanwords that have enriched target languages. Because of the laboriousness of the translation process, efforts have been made, with varying degrees of success, to automate translation or to mechanically aid the human translator.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory, the memory comprising instructions that are executed by the processor to configure the processor to implement an efficient translating mechanism to efficiently translating social media posts. The method comprises, responsive to receiving a request to translate a social media post in a source language and a target language, identifying the source language to be used to translate the social media post based on words within the social media post. The method also comprises identifying a highest classification associated with words of the social media post matched to the identified source language to be used to translate the social media post. Moreover, the method comprises translating the social media post from the source language to the target language on a sentence-by-sentence basis using a translation level associated with the highest classification. The translation of a sentence comprises: for each word of a set of words in the sentence, identifying the word in the source language and its related meaning in the target language from a multi-language data structure; categorizing each word in the set of words into its associated part of speech; generating a sentence in the target language utilizing the identified words in the target language and their associated parts of speech; and performing natural language processing on each generated sentence in the target language to determine whether one or more ambiguous connotations exists. Additionally, the method comprises, responsive to each sentence failing have any ambiguous connotations, generating a social medial post in the target language utilizing the generated sentences.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will he described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As noted previously, language translation, which converts a source-language text to an equivalent target-language text, has an inherent risk of inadvertently introducing source-language words, grammar, or syntax into the target-language rendering. Further, with the laboriousness of the translation process, when social media posts are analyzed with higher production, processing of the social media posts increases. Conversely, when social media posts are analyzed with lower production, while processing may increase, the opportunity to overlook key information within the social media posts also increases.

Thus, the illustrative embodiments provide mechanisms for efficient translating of social media posts using deep-learning techniques. Initially, the efficient translating mechanism performs a language identification process in order to identify which source language is to be used to translate the social media post. For each word within the social media post, efficient translating mechanism analyzes a multi-language database to identify a matching word. Since many languages may have similar words, efficient translating mechanism may identify a word within more than one language that matches the word in the social media post. Thus, for each word within the social media post, efficient translating mechanism generates a list of languages that have words that match the word within the social media post. Either at an end of an analysis of all the words within the social media post or at a point within the language identification process when a particular language has exceeded all other identified languages above a predetermined threshold, efficient translating mechanism identifies the language to utilize for a source-language portion of the social media post translation.

In the illustrative embodiments, if the word is not found within the multi-language database, efficient translating mechanism performs a search of one or more other data structures to identify a language or languages associated with the word. If identified, efficient translating mechanism adds the word and the associated language/languages to the multi-language database. Further, efficient translating mechanism may also identify a meaning or meanings of the word. If the word has multiple meanings or a meaning that may be sensitive in nature, efficient translating mechanism associates an appropriate restriction type to the word as it is added to the multi-language database. In accordance with one illustrative embodiment, restriction type is based on the type of grammar used thereby indicating the word to be ambiguous. In accordance with another illustrative embodiment, the restriction type may indicate that the word has anti-social elements that may indicate harm to a country, groups of people, a particular person, or the like.

With regard to the restriction type, while performing the language identification process, efficient translating mechanism keeps track of a classification associated with words of the social media post in order to identify a level of translation that will be required to translate the social media post from the source language to the target language. That is, many times, words within languages may have different meaning, i.e. different sentiment meanings. Thus, each word in the multi-language database has an associated restriction type: type-0, type-1, type-2, type-3, or the like. Social media posts that utilize words that are identified as ambiguous will require a more intense translation in order to reduce the level of ambiguity. Conversely, social media posts that utilize words that are identified as less ambiguous may only require a straightforward translation.

In accordance with one illustrative embodiment, a type-0 restriction type is associated with unrestricted grammar and utilizes turing machine translation. A type-1 restriction type is associated with context-sensitive grammar and utilizes linear-bounded automaton translation. A type-2 restriction type is associated with context-free grammar and utilizes pushdown automaton translation. A type-3 restriction type is associated with regular grammar and utilizes finite state automaton translation. Accordingly, for each word and for each identified language, efficient translating mechanism keeps track of the highest restriction type that is identified. For example, if, during the language identification process, the highest identified restriction type is type-1, the efficient translating mechanism will utilize an associated type-1 level of translation. As another example, if, during the language identification process, the highest identified restriction type is type-3, the efficient translating mechanism will utilize an associated type-3 level of translation.

In accordance with aspects of the illustrative embodiments, the restriction type may also indicate a level of criticality in translating the social media post. That is, in addition to a restriction type associated with an identified ambiguous word, multi-language database may also have restriction types associated with sensitive words, i.e. words that may indicate anti-social elements that could indicate harm to a country, groups of people, a particular person, or the like. Thus, while a word in the multi-language database may not have an ambiguous meaning, the word may have a high restriction type due to its appearance within any text.

After identifying the language to utilize for the source-language portion of the social media post translation, the level of translation that will be required to translate the social media post from the source language to the target language based on the identified highest level of restriction type, and the target language, efficient translating mechanism begins the process of translating the social media post from the source language to the target language on a sentence-by-sentence basis. For each word in the social media post, efficient translating mechanism identifies the word in the source language and its related meaning in the target language. The efficient translating mechanism categorizes each word into its associated part of speech, i.e. noun, pronoun, verb, adverb, predicate, or the like. The efficient translating mechanism then generates a sentence in the target language utilizing the identified words in the target language and their associated parts of speech. It should be noted that the newly generated sentence may not have the identified words in the target language in a same order as the words in the source language. That is, it is common for different language to have different grammatical sentence structures. Thus, the sentence in the target language may have a different grammatical sentence structure than the sentence from the social media post, while still having the same meaning.

While generating the sentence in the target language, efficient translating mechanism may also perform natural language processing on the newly generated sentence to identify whether the sentence in the target language has any ambiguous connotations. This may include efficient translating mechanism analyzing the newly generated sentence in view of either or both of a preceding or a succeeding sentence(s). If the natural language processing indicates that the sentence by itself or in view of either or both of the preceding or the succeeding sentence(s) is ambiguous, efficient translating mechanism may change the level of restriction type that is being used for translation and restart the translation process for all portions of the social media post so that a less or non-ambiguous translation may be generated. Furthermore, if a particular word or portion of a sentence, is identified as ambiguous during the translation, efficient translating mechanism may change the restriction type of the associated word in the source language of the multi-language database through a deep-learning process so that later translations utilize an appropriate level of translation initially. Once the entire social media post has been translated from the source language to the target language, efficient translating mechanism generates a social medial post in the target language.

Thus, the mechanisms of the illustrative embodiments provide an efficient translating of social media posts using deep-learning techniques. Social media posts are translated using different precision/accuracy levels based on the nature of the words within the sentence rather than merely translating from a source language to a target language and leaving it up to the reader to determine if there is ambiguity or a need for a more accurate translation.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
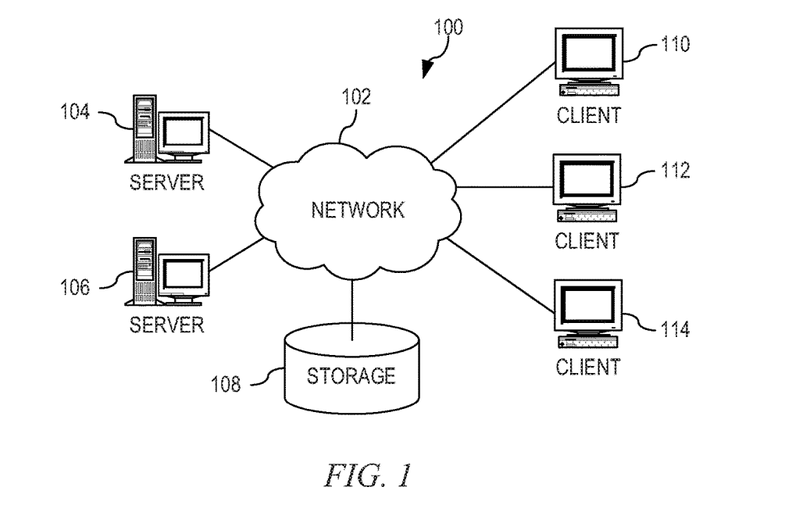
FIG. 1 is an example diagram of a distributed data processing system in which aspects of the illustrative embodiments may be implemented.
Figure 2:
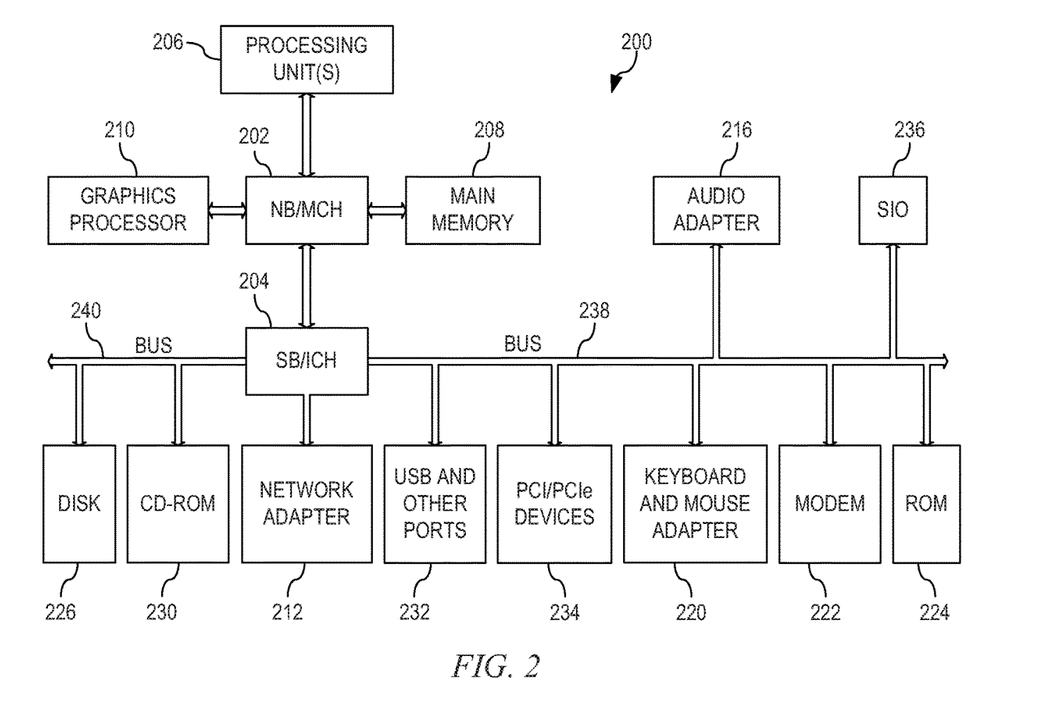
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement an efficient translating mechanism. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates efficiently translating of social media posts using deep-learning techniques.

As noted above, the mechanisms of the illustrative embodiments utilize specifically configured computing devices, or data processing systems, to perform the operations for efficiently translating of social media posts using deep-learning techniques. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may he implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240, PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the efficient translating of social media posts using deep-learning techniques.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
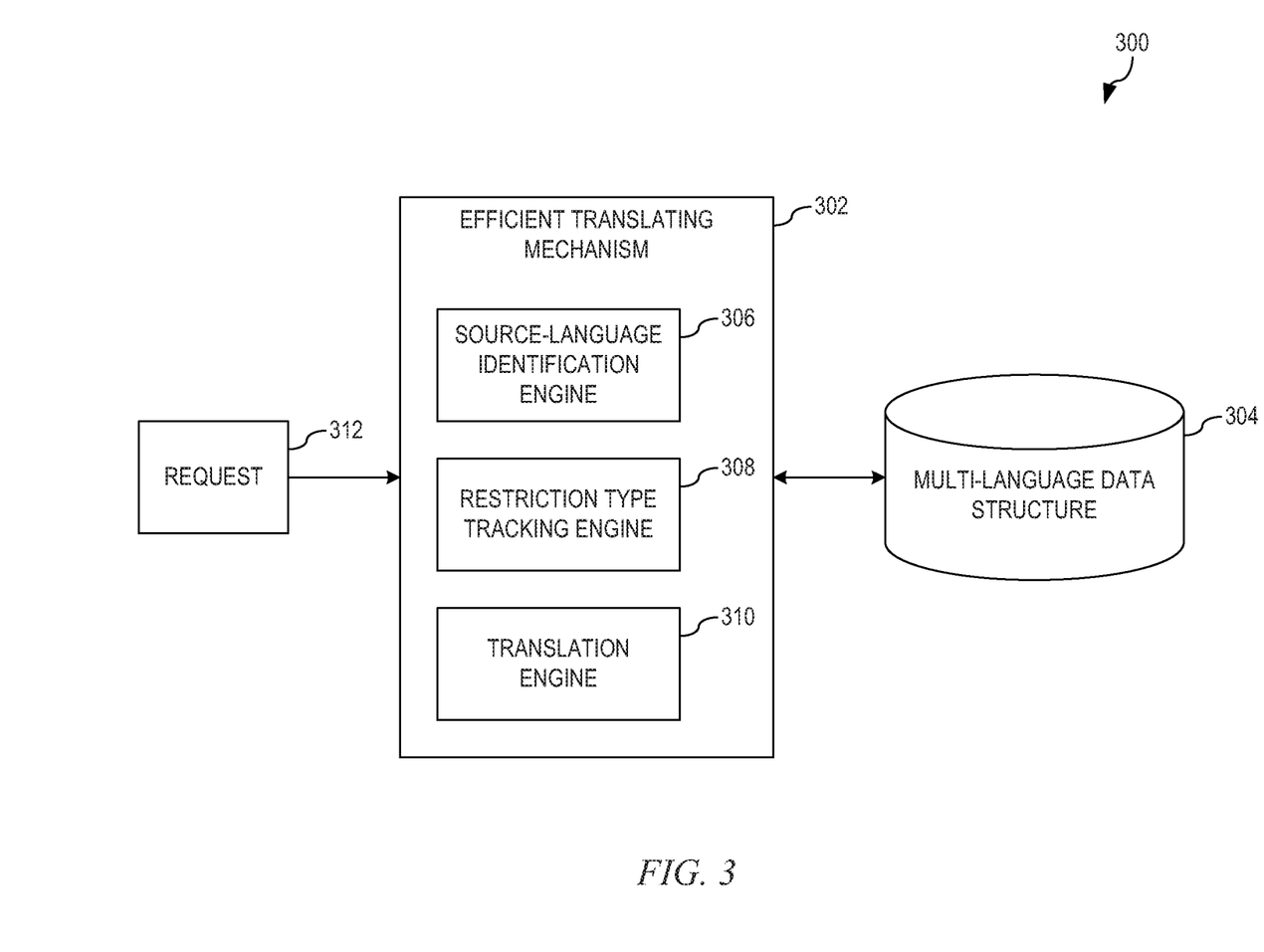
FIG. 3 depicts a functional block diagram of a data processing system that efficiently translates social media posts using deep-learning techniques in accordance with an illustrative embodiment.

FIG. 3 depicts a functional block diagram of a data processing system that efficiently translates social media posts using deep-learning techniques in accordance with an illustrative embodiment. Data processing system comprises efficient translating mechanism 302 and multi-language data structure 304. Efficient translating mechanism 302 further comprises source-language identification engine 306, restriction type tracking engine 308, and translation engine 310. Responsive to receiving request 312 to translate a social media post in a source language and a desired target language, source-language identification engine 306 initiates a process to identify which source language is to be used to translate the social media post. For each word within the social media post, source-language identification engine 306 analyzes multi-language data structure 304 to identify a matching word. Since many languages may have similar words, source-language identification engine 306 may identify a word within more than one language that matches the word in the social media post. Thus, for each word within the social media post, source-language identification engine 306 generates a list of languages that have words that match the word within the social media post. Source-language identification engine 306 then determines whether all the words within the social media post have been analyzed. If so, source-language identification engine 306 identifies the language that is most common to all the words within the social media post as the source language to utilize for the social media post translation. However, if not all the words within the social media post have been analyzed but one identified language has exceeded all other identified languages above a predetermined threshold, then source-language identification engine 306 ends the language identification process and identifies the language that exceeds all other identified languages above the predetermined threshold as the source language to utilize for the social media post translation.

During the language identification process, if the word is not found within the multi-language database, source-language identification engine 306 performs a search of one or more other data structures to identify a language or languages associated with the word. If source-language identification engine 306 identifies the word in one of the one or more other data structures, source-language identification engine 306 adds the word and the associated language/languages to multi-language data structure 304. Source-language identification engine 306 also identifies a meaning or meanings of the word. If the word has multiple meanings or a meaning that may be sensitive in nature, source-language identification engine 306 associates an appropriate restriction type to the word as it is added to multi-language data structure 304. In accordance with one illustrative embodiment, restriction type is based on the type of grammar used thereby indicating the word to be ambiguous. In accordance with another illustrative embodiment, the restriction type may indicate that the word has anti-social elements that may indicate harm to a country, groups of people, a particular person, or the like.

While performing the language identification process, restriction type tracking engine 308 keeps track of a highest classification associated with words matched in multi-language data structure 304 in order to identify a level of translation that will be required to translate the social media post from the source language to the target language. That is, many times, words within languages may have different meaning, i.e. different sentiment meanings. Thus, each word in the multi-language database has an associated restriction type: type-0, type-1, type-2, type-3, or the like. Accordingly, for each word and for each identified language, restriction type tracking engine 308 keeps track of the highest restriction type that is identified. For example, if, during the language identification process, the highest identified restriction type is type-1, the efficient translating mechanism will utilize an associated type-1 level of translation. As another example, if, during the language identification process, the highest identified restriction type is type-3, the efficient translating mechanism will utilize an associated type-3 level of translation. The restriction type may identify a level of ambiguity or word sensitivity.

After identifying the language to utilize for the source-language portion of the social media post translation, the level of translation that will be required to translate the social media post from the source language to the target language based on the identified highest level of restriction type, and the target language, translation engine 310 begins translating the social media post from the source language to the target language on a sentence-by-sentence basis. For each word in the social media post, translation engine 310 identifies the word in the source language and its related meaning in the target language from multi-language data structure 304. Translation engine 310 categorizes each word into its associated part of speech, i.e. noun, pronoun, verb, adverb, predicate, or the like. Translation engine 310 then generates a sentence in the target language utilizing the identified words in the target language and their associated parts of speech. It should be noted that the newly generated sentence may not have the identified words in the target language in a same order as the words in the source language. That is, it is common for different language to have different grammatical sentence structures. Thus, the sentence in the target language may have a different grammatical sentence structure than the sentence from the social media post, while stilt having the same meaning.

While generating the sentence in the target language, translation engine 310 performs natural language processing on the newly generated sentence to identify whether the sentence in the target language has any ambiguous connotations. This may include translation engine 310 analyzing the newly generated sentence in view of either or both of a preceding or a succeeding sentence(s). If translation engine 310 identifies that the sentence by itself or in view of either or both of the preceding or the succeeding sentence(s) is ambiguous, translation engine 310 may change the level of restriction type that is being used for translation and restart the translation process for all portions of the social media post so that a less or non-ambiguous translation may be generated. Furthermore, if a particular word or portion of a sentence, is identified as ambiguous during the translation, translation engine 310 changes the restriction type of the associated word in the source language of multi-language data structure 304 through a deep-learning process so that later translations utilize an appropriate level of translation initially. Once the entire social media post has been translated from the source language to the target language, translation engine 310 generates a social medial post in the target language.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), in some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
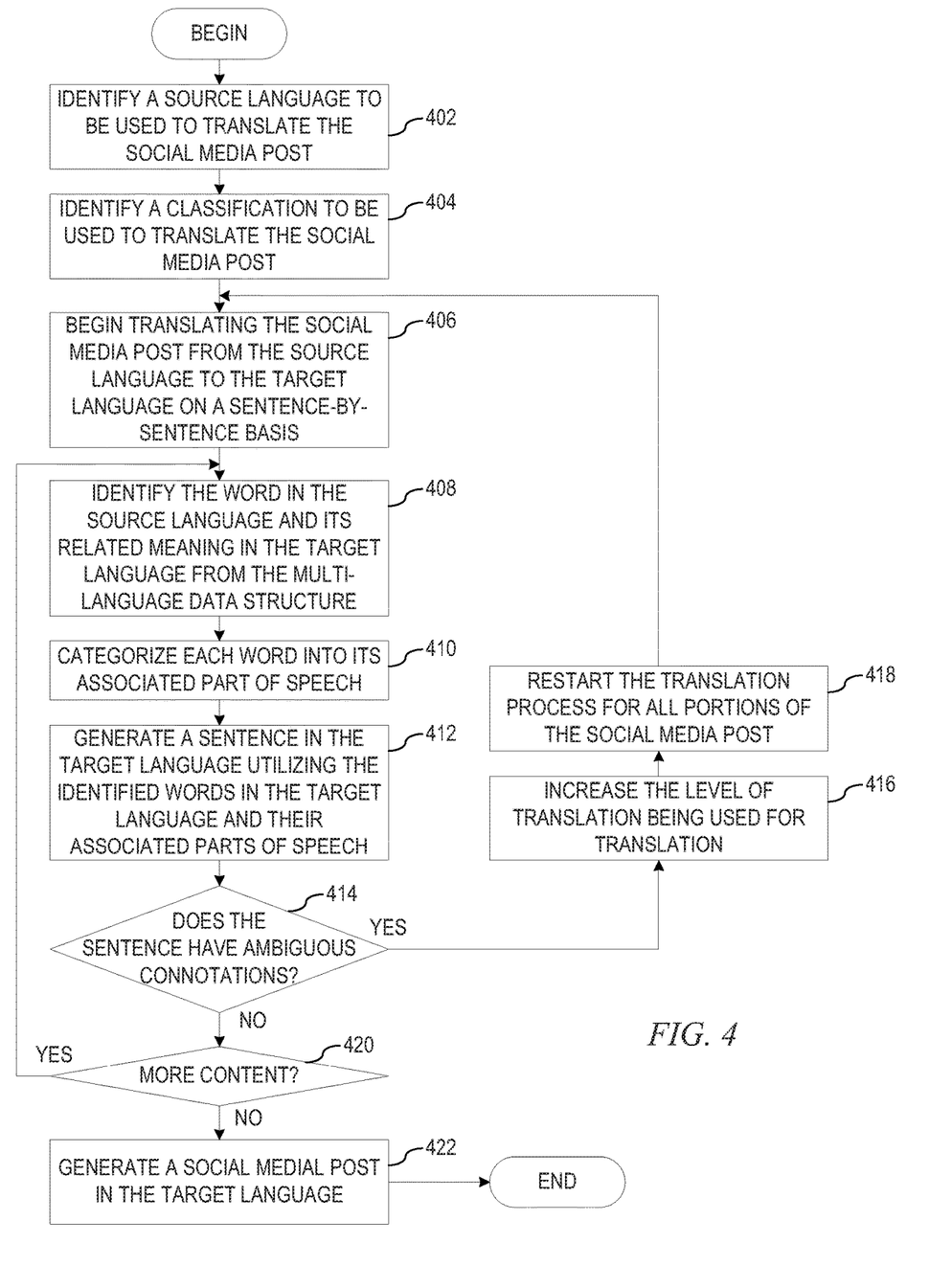
FIG. 4 depicts an exemplary flowchart of the operation of efficiently translating social media posts using deep-learning techniques in accordance with an illustrative embodiment.

FIG. 4 depicts an exemplary flowchart of the operation of efficiently translating social media posts using deep-learning techniques in accordance with an illustrative embodiment. As the operation beings, responsive to receiving a request to translate a social media post in a source language and a desired target language, the efficient translating mechanism identifies which source language is to be used to translate the social media post (step 402). The efficient translating mechanism also identifies a highest classification associated with words of the social media post matched to the identified source language to be used to translate the social media post (step 404). After identifying the language to utilize for the source-language portion of the social media post translation, the level of translation that will be required to translate the social media post from the source language to the target language based on the identified highest classification of restriction type, and the desired target language, the efficient translating mechanism begins translating the social media post from the source language to the target language on a sentence-by-sentence basis (step 406). For each word on a sentence-by-sentence basis in the social media post, the efficient translating mechanism identifies the word in the source language and its related meaning in the target language from the multi-language data structure (step 408).

The efficient translating mechanism categorizes each word into its associated part of speech, i.e. noun, pronoun, verb, adverb, predicate, or the like (step 410) and generates a sentence in the target language utilizing the identified words in the target language and their associated parts of speech (step 412). While generating the sentence in the target language, efficient translating mechanism performs natural language processing on the newly generated sentence to identify whether the sentence in the target language has any ambiguous connotations (step 414). This may include the efficient translating mechanism analyzing the newly generated sentence in view of either or both of a preceding or a succeeding sentence(s). If at step 414 the efficient translating mechanism identifies that the sentence by itself or in view of either or both of the preceding or the succeeding sentence(s) is ambiguous, the efficient translating mechanism increases the level of translation being used for translation (step 416) and restarts the translation process for all portions of the social media post so that a less or non-ambiguous translation may be generated (step 418) with the operation retuning to step 406. If at step 414 the efficient translating mechanism identifies that the sentence by itself or in view of either or both of the preceding or the succeeding sentence(s) fails to he ambiguous, the efficient translating mechanism determines whether the entire social media post has been translated (step 420). If at step 420 the efficient translating mechanism identifies there is more content of the social media post that is to be translated, the operation returns to step 408. If at step 420 the efficient translating mechanism identifies there is no more content of the social media post that is to be translated, the efficient translating mechanism generates a social medial post in the target language (step 422), with the operation ending thereafter.

Figure 5:
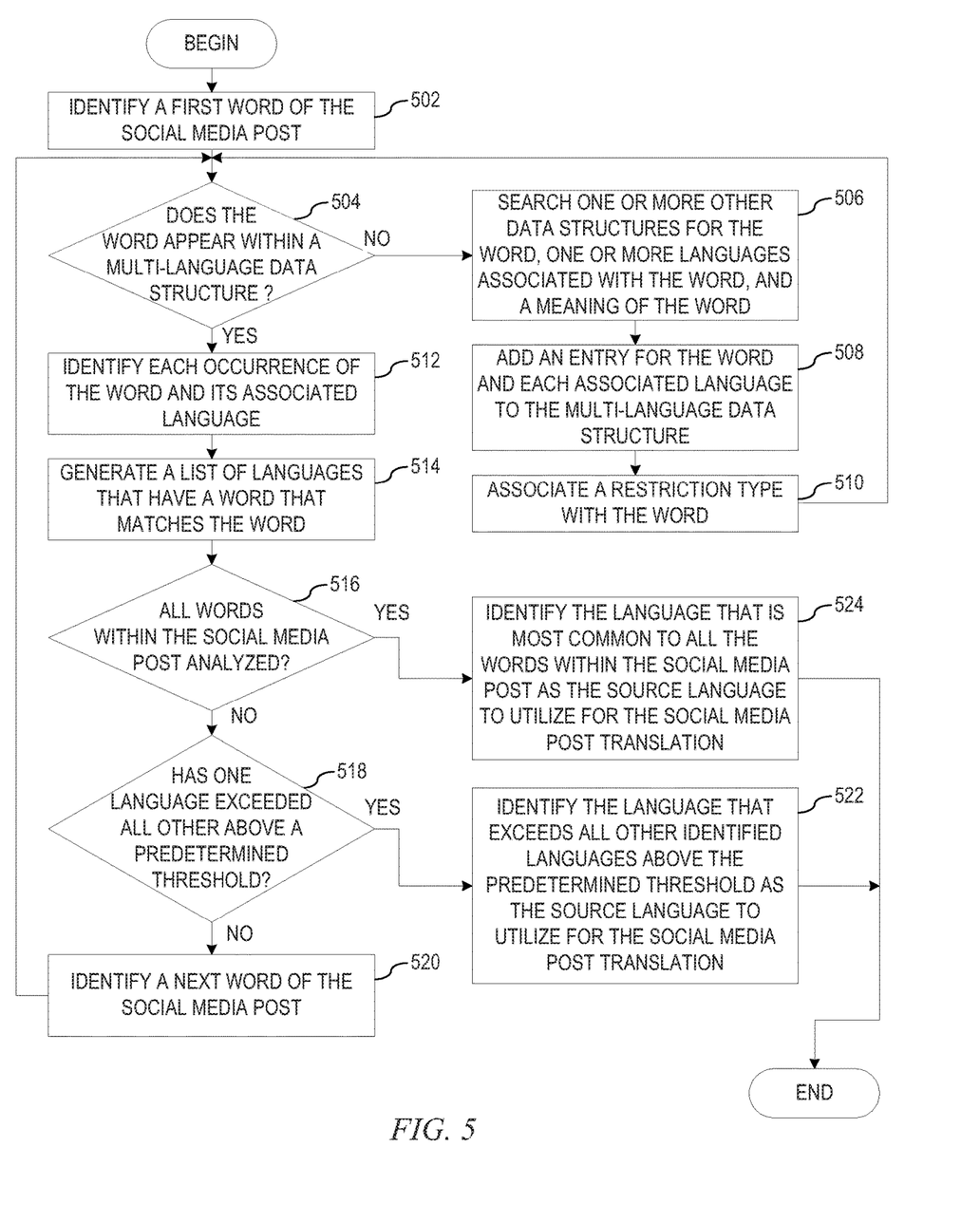
FIG. 5 depicts an exemplary flowchart of the operation performed by an efficient translating mechanism in identifying a source language to utilize for translating of a social media post in accordance with an illustrative embodiment.

FIG. 5 depicts an exemplary flowchart of the operation performed by an efficient translating mechanism in identifying a source language to utilize for translating of a social media post in accordance with an illustrative embodiment. As the operation begins the efficient translating mechanism identifies a first word of the social media post (step 502). The efficient translating mechanism determines whether the word appears within a multi-language data structure (step 504). If at step 504 the word fails to appear anywhere in the multi-language data structure, the efficient translating mechanism searches one or more other data structures for the word, one or more languages associated with the word, and a meaning of the word (step 506). Upon identifying the set of languages associated with the word, the efficient translating mechanism adds an entry for the word and each associated language to the multi-language data structure (step 508). Utilizing the identified meaning of the word, the efficient translating mechanism associates a restriction type with the word which is utilized for later transcription of social media posts the comprise the word (step 510). The process then returns to step 504.

If at step 504 the word appears in the multi-language data structure, the efficient translating mechanism identifies each occurrence of the word and its associated language (step 512). Based on each occurrence, the efficient translating mechanism generates a list of languages that have a word that matches the word (step 514). The efficient translating mechanism then determines whether all the words within the social media post have been analyzed (step 516). If at step 516 not all the words within the social media post have been analyzed, then efficient translating mechanism determines whether one of the identified languages has exceeded all other identified languages above a predetermined threshold (step 518). If at step 518 no one language exceeds all other identified languages above the predetermined threshold, the efficient translating mechanism identifies a next word of the social media post (step 520), and the operation returns to step 504.

If at step 518 one language exceeds all other identified languages above the predetermined threshold, the efficient translating mechanism identifies the language that exceeds all other identified languages above the predetermined threshold as the source language to utilize for the social media post translation (step 522), with the operation ending thereafter. If at step 516 all the words within the social media post have been analyzed, the efficient translating mechanism identifies the language that is most common to all the words within the social media post as the source language to utilize for the social media post translation (step 524), with the operation ending thereafter.

Figure 6:
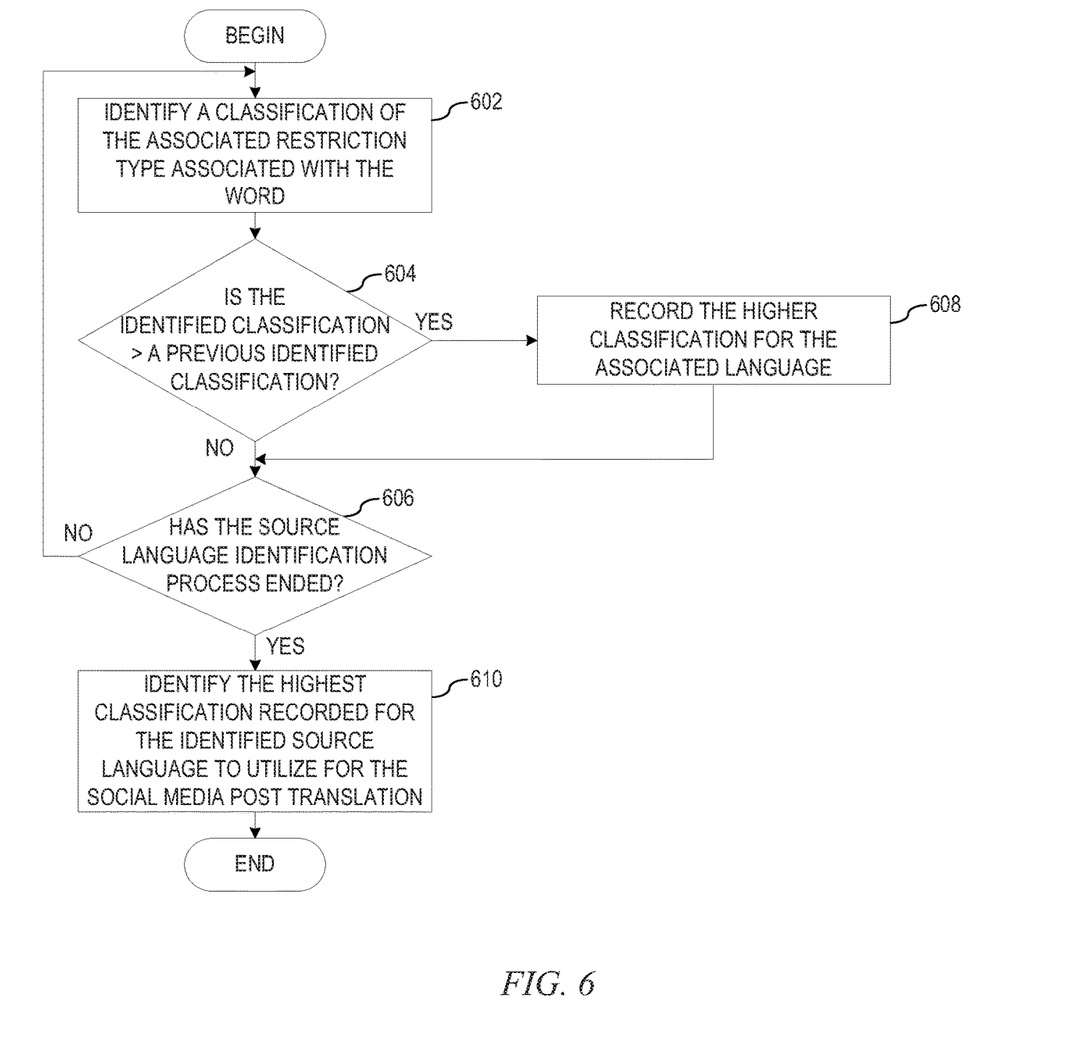
FIG. 6 depicts an exemplary flowchart of the operation performed by an efficient translating mechanism in identifying a restriction type to utilize for translating of a social media post in accordance with an illustrative embodiment.

FIG. 6 depicts an exemplary flowchart of the operation performed by an efficient translating mechanism in identifying a restriction type to utilize for translating of a social media post in accordance with an illustrative embodiment. As the operation begins, as each word and each language matching a word in the multi-language data structure is identified, the efficient translating mechanism identifies a classification of the associated restriction type associated with the word (step 602). The efficient translating mechanism determines whether the identified classification for the identified language is greater than a previous identified classification identified for the language (step 604). If at step 604 the identified classification for the identified language fails to be greater than the previous identified classification identified for the language, the efficient translating mechanism determines whether the source language identification process has ended (step 606). If at step 604 the identified classification for the identified language is greater than the previous identified classification identified for the language, the efficient translating mechanism records the higher classification for the associated language (step 608) with the operation proceeding to step 606 thereafter. If at step 606 the source language identification process has not ended, the operation returns to step 602. If at step 606 the source language identification process has ended, the efficient translating mechanism utilizes the identified source language to utilize for the social media post translation of FIG. 5 to identify the highest classification recorded for the identified source language to utilize for the social media post translation (step 610), with the operation ending thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or early out combinations of special purpose hardware and computer instructions.

Thus, the illustrative embodiments provide mechanisms for efficiently translating of social media posts using deep-learning techniques. Social media posts are translated using different precision/accuracy levels based on the nature of the words within the sentence rather than merely translating from a source language to a target language and leaving it up to the reader to determine if there is ambiguity or a need for a more accurate translation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions that are executed by the at least one processor to cause the at least one processor to be configured to implement an efficient translating mechanism to efficiently translating social media posts, the method comprising:

responsive to receiving a request to translate a social media post in a source language to a target language, identifying the source language to be used to translate the social media post in the source language to the target language based on words within the social media post;

identifying a highest classification associated with words of the social media post matched to the identified source language to be used to translate the social media post in the source language to the target language;

translating the social media post from the source language to the target language on a sentence-by-sentence basis using a translation level associated with the highest classification, wherein the translation of each sentence in a set of sentences of the social media post in the source language comprises:

for each word of a set of words in the sentence, identifying the word in the source language and its related meaning in the target language from a multi-language data structure;

categorizing each word in the set of words into its associated part of speech; and generating a sentence in the target language utilizing the identified words in the target language and their associated parts of speech;

performing natural language processing on each generated sentence in a set of sentences in the target language to determine whether one or more ambiguous connotations exists;

responsive to each sentence failing have any ambiguous connotations, generating a social medial post in the target language utilizing the set of sentences in the target language; and responsive to a generated sentence having at least one ambiguous connotation, the method further comprises:

identifying a word within the generated sentence causing the at least one ambiguous connotation; and increasing a restriction type of the associated word in the source language of the multi-language data structure so that later translations utilize an appropriate level of grammar and an appropriate level of translation associated with the further restriction associated with the increased restriction type.

2. The method of claim 1, wherein determining whether one or more ambiguous connotations exists comprises comparing the generated sentence to either of a preceding sentence or a succeeding sentence.

3. The method of claim 1, wherein, responsive to a generated sentence having an ambiguous connotation, the method further comprises:

increases the translation level being used for translation; and restarting the translation process for all portions of the social media post.

4. The method of claim 1, wherein identifying the source language to be used to translate the social media post based on words within the social media post comprises:
- for a set of words of the words appearing in the social media post, determining whether the set of word appear within the multi-language data structure;
- for each word of the set of words, responsive to the word appearing in the multi-language data structure, identifying each occurrence of the word and its associated language;
- generating a list of languages for the words in the set of words; and
- identifying a language from the list of languages as the source language to be used to translate the social media post.

5. The method of claim 1, wherein the language from the list of languages is identified based on the language exceeding all other identified languages above a predetermined threshold.

6. The method of claim 1, wherein the language from the list of languages is identified based on the language being most common to all the words within the social media post.

7. The method of claim 1, wherein, responsive to the word failing to appear in the multi-language data structure, the word is added to the multi-language data structure by the method comprising:
- searching one or more other data structures for the word, one or more languages associated with the word, and a meaning of the word;
- upon identifying a set of languages associated with the word, adding an entry for the word and each associated language to the multi-language data structure; and
- utilizing the identified meaning of the word, associating a restriction type with the word which is utilized for later transcription of social media that comprise the word.

8. A computer program product comprising a computer readable storage medium having a computer readable program stored therein, wherein the computer readable program, When executed on a data processing system, causes the data processing system to implement an efficient translating mechanism to efficiently translating social media posts, and further causes the data processing system to:
- responsive to receiving a request to translate a social media post in a source language to a target language, identify the source language to be used to translate the social media post in the source language to the target language based on words within the social media post;
- identify a highest classification associated with words of the social media post matched to the identified source language to be used to translate the social media post in the source language to the target language;
- translate the social media post from the source language to the target language on a sentence-by-sentence basis using a translation level associated with the highest classification, wherein the translation of each sentence- in a set of sentences of the social media post in the source language further causes the data processing system to;
  - for each word of a set of words in the sentence, identify the word in the source language and its related meaning in the target language from a multi-language data structure;
  - categorize each word in the set of words into its associated part of speech; and
  - generate a sentence in the target language utilizing the identified words in the target language and their associated parts of speech;
- perform natural language processing on each generated sentence in a set of sentences in the target language to determine whether one or more ambiguous connotations exists;
- responsive to each sentence failing have any ambiguous connotations, generate a social medial post in the target language utilizing the set of sentences in the target language; and
- responsive to a generated sentence having at least one ambiguous connotation, the method further comprises:
  - identify a word within the generated sentence causing the at least one ambiguous connotation; and
  - increase a restriction type of the associated word in the source language of the multi-language data structure so that later translations utilize an appropriate level of grammar and an appropriate level of translation associated with the further restriction associated with the increased restriction type.

9. The computer program product of claim 8, wherein determining whether one or more ambiguous connotations exists comprises comparing the generated. sentence to either of a preceding sentence or a succeeding sentence.

10. The computer program product of claim 8, wherein, responsive to a generated sentence having an ambiguous connotation, the computer readable program further causes the data processing system to:
- increase the translation level being used for translation; and
- restart the translation process for all portions of the social media post.

11. The computer program product of claim 8, wherein the computer readable program to identify the source language to be used to translate the social media post based on words within the social media post further causes the data processing system to:
- for a set of words of the words appearing in the social media post, determine whether the set of word appear within the multi-language data structure;
- for each word of the set of words, responsive to the word appearing in the multi-language data structure, identify each occurrence of the word and its associated language;
- generating a list of languages for the words in the set of words; and
- identifying a language from the list of languages as the source language to be used to translate the social media post.

12. The computer program product of claim 8, wherein, responsive to the word failing to appear in the multi-language data structure, the computer readable program further causes the data processing system to add the word to the multi-language data structure by:
- searching one or more other data structures for the word, one or more languages associated with the word, and a meaning of the word;
- upon identifying a set of languages associated with the word, adding an entry for the word and each associated language to the multi-language data structure; and
- utilizing the identified. meaning of the word, associating a restriction type with the word which is utilized for later transcription of social media posts that comprise the word.

13. An apparatus comprising:
- at least one processor; and
- at least one memory coupled to the at least one processor, wherein the at least one memory comprises instructions which, when executed by the at least one processor, cause the at least one processor to implement an efficient translating mechanism to efficiently translating social media posts, and further cause the at least one processor to:

responsive to receiving a request to translate a social media post in a source language to a target language, identify the source language to be used to translate the social media post in the source language to the target language based on words within the social media post;

identify a highest classification associated with words of the social media post matched to the identified source language to he used to translate the social media post in the source language to the target language;

translate the social media post from the source language to the target language on a sentence-by-sentence basis using a translation level associated with the highest classification, wherein the translation of each sentence-in a set of sentences of the social media post in the source language further causes the at least one processor to:

for each word of a set of words in the sentence, identify the word in the source language and its related meaning in the target language from a multi-language data structure;

categorize each word in the set of words into its associated part of speech; and generate a sentence in the target language utilizing the identified words in the target language and their associated parts of speech;

perform natural language processing on each generated sentence in a set of sentences in the target language to determine whether one or more ambiguous connotations exists;

responsive to each sentence failing have any ambiguous connotations, generate a social medial post in the target language utilizing the set of sentences in the target language; and responsive to a generated sentence having at least one ambiguous connotation, the method further comprises:

identify a word within the generated sentence causing the at least one ambiguous connotation; and increase a restriction type of the associated word in the source language of the multi-language data structure so that later translations utilize an appropriate level of grammar and an appropriate level of translation associated with the further restriction associated with the increased restriction type.

14. The apparatus of claim 13, wherein determining whether one or more ambiguous connotations exists comprises comparing the generated sentence to either of a preceding sentence or a succeeding sentence.

15. The apparatus of claim 13, wherein, responsive to a generated sentence having an ambiguous connotation, the instructions further cause the at least one processor to:

increase the translation level being used for translation; and restart the translation process for all portions of the social media post.

16. The apparatus of claim 13, wherein the instructions to identify the source language to be used to translate the social media post based on words within the social media post further causes the at least one processor to:

for a set of words of the words appearing in the social media post, determine whether the set of word appear within the multi-language data structure;

for each word of the set of words, responsive to the word appearing in the multi-language data structure, identify each occurrence of the word and its associated language;

generating a list of languages for the words in the set of words; and identifying a language from the list of languages as the source language to be used to translate the social media post.

17. The apparatus of claim 13, wherein, responsive to the word failing to appear in the multi-language data structure, the instructions further cause the at least one processor to add the word to the multi-language data structure by:

searching one or more other data structures for the word, one or more languages associated with the word, and a meaning of the word;

upon identifying a set of languages associated with the word, adding an entry for the word and each associated language to the multi-language data structure; and utilizing the identified meaning of the word, associating a restriction type with the word which is utilized for later transcription of social media posts that comprise the word.

* * * * *